US009353848B2

(12) United States Patent
Blewett et al.

(10) Patent No.: US 9,353,848 B2
(45) Date of Patent: May 31, 2016

(54) SPLINE LUBRICATION SYSTEM

(71) Applicant: Hamilton Sundstrand Corporation, Windsor Locks, CT (US)

(72) Inventors: Michael R. Blewett, Stillman Valley, IL (US); Keith E. Short, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 640 days.

(21) Appl. No.: 13/799,415

(22) Filed: Mar. 13, 2013

(65) Prior Publication Data

US 2014/0274420 A1    Sep. 18, 2014

(51) Int. Cl.
| F16H 57/04 | (2010.01) |
| F16N 21/00 | (2006.01) |
| F01D 5/02 | (2006.01) |
| F04C 15/00 | (2006.01) |
| F01D 25/18 | (2006.01) |
| F02C 7/32 | (2006.01) |

(52) U.S. Cl.
CPC ............ *F16H 57/043* (2013.01); *F01D 5/026* (2013.01); *F01D 25/18* (2013.01); *F02C 7/32* (2013.01); *F04C 15/0088* (2013.01); *F16H 57/0421* (2013.01); *F16H 57/0424* (2013.01); *F16H 57/0426* (2013.01); *F16H 57/0486* (2013.01); *F16N 21/00* (2013.01); *F05D 2260/4031* (2013.01); *F05D 2260/98* (2013.01)

(58) Field of Classification Search
CPC ......... F01D 25/18; F01D 5/026; F16N 21/00; F04C 15/0088; F16H 57/043; F16H 57/0424; F16H 57/0421; F16H 57/0426; F05D 2260/4031; F05D 2260/98
USPC ........................................................ 415/112
See application file for complete search history.

(56) References Cited

U.S. PATENT DOCUMENTS

| 4,493,623 A | 1/1985 | Nelson |
| 4,669,999 A | 6/1987 | Miller |

(Continued)

FOREIGN PATENT DOCUMENTS

| DE | 146327 A1 | 2/1981 |
| DE | 102009055005 A1 | 9/2010 |

(Continued)

OTHER PUBLICATIONS

The Search Report for Great Britain Application No. GB1403842.6 dated Oct. 2, 2014.

*Primary Examiner* — Kenneth Bomberg
*Assistant Examiner* — Wesley Harris
(74) *Attorney, Agent, or Firm* — Kinney & Lange, P.A.

(57) ABSTRACT

A gearbox assembly for use in a gas turbine engine includes a gearbox housing and first and second shafts. The first shaft is rotatably mounted in the gearbox housing. The first shaft has a first set of splines and defines a central cavity. The second shaft has a second set of splines engaged with the first set of splines. A scupper is positioned on an inner surface of the gearbox housing proximate the first shaft so as to direct liquid from the scupper through the central cavity of the first shaft to the first and second sets of splines.

13 Claims, 4 Drawing Sheets

(56) References Cited

U.S. PATENT DOCUMENTS

| | | | |
|---|---|---|---|
| 4,844,202 A | 7/1989 | Maresko | |
| 4,987,974 A * | 1/1991 | Crouch | F16H 57/043 184/11.1 |
| 5,119,905 A | 6/1992 | Murray | |
| 5,694,765 A * | 12/1997 | Hield | F02C 3/113 60/39.163 |
| 6,511,228 B2 | 1/2003 | Dusza | |
| 6,793,042 B2 | 9/2004 | Brouillet | |
| 2011/0129291 A1 * | 6/2011 | Humes | F16D 1/10 403/40 |
| 2012/0219444 A1 | 8/2012 | Shah et al. | |
| 2012/0251234 A1 | 10/2012 | Lemmers, Jr. | |

FOREIGN PATENT DOCUMENTS

| | | |
|---|---|---|
| EP | 0861777 A1 | 9/1998 |
| JP | H10159527 A | 6/1998 |

* cited by examiner

SPLINE LUBRICATION SYSTEM

BACKGROUND

The present invention relates to gas turbine engines, and in particular, to gearboxes on gas turbine engines. Gas turbine engines typically have at least one spool that includes a compressor and a turbine. An accessory gearbox is often connected to and driven by the spool, and provides gearing to connect the spool to various accessories, such as alternators, pumps, and engine starters, for example.

Some accessories include an accessory shaft having splines that engage with corresponding splines on a gear shaft. Such splines are typically lubricated to reduce friction and wear between the splines. In some gearboxes, a lubrication system includes an oil jet that supplies lubrication to the splines. Such oil jets typically supply a continuous flow of lubricating liquid during operation of the lubrication system and the gas turbine engine.

SUMMARY

According to the present invention, a gearbox assembly for use in a gas turbine engine includes a gearbox housing and first and second shafts. The first shaft is rotatably mounted in the gearbox housing. The first shaft has a first set of splines and defines a central cavity. The second shaft has a second set of splines engaged with the first set of splines. A scupper is positioned on an inner surface of the gearbox housing proximate the first shaft so as to direct liquid from the scupper through the central cavity of the first shaft to the first and second sets of splines.

Another embodiment is a method that includes rotating first and second shafts interconnected by splines and mounted to a gearbox. Lubricating liquid is collected in a scupper positioned on an inner surface of the gearbox. Lubricating liquid flows from the scupper through the first shaft to the splines when the first and second shafts stop rotating.

Another embodiment is a method that includes rotating first and second shafts interconnected by splines and mounted to a gearbox. A single shot of lubricating liquid flows to the splines when the first and second shafts stop rotating. Substantially no additional lubricating liquid flows to the splines when the first and second shafts start rotating again.

DETAILED DESCRIPTION

Figure 1:
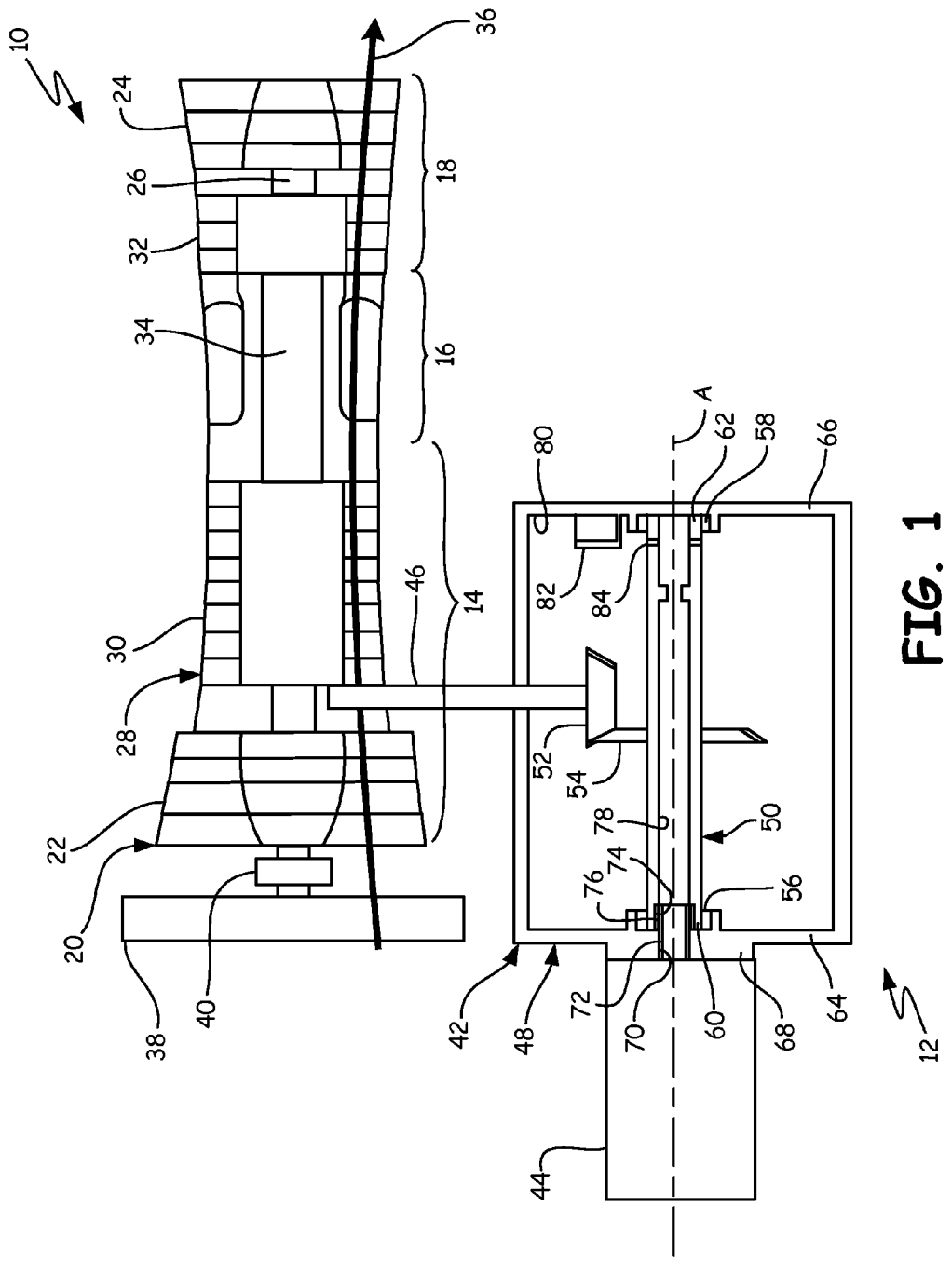
FIG. 1 is a schematic sectional view of a gas turbine engine with an accessory gearbox assembly.

FIG. 1 is a schematic sectional view of gas turbine engine 10 having gearbox assembly 12. Gas turbine engine 10 includes main compressor section 14, main combustor section 16, and main turbine section 18. Low pressure spool 20 (which includes low pressure compressor 22 and low pressure turbine 24 connected by low pressure shaft 26) and high pressure spool 28 (which includes high pressure compressor 30 and high pressure turbine 32 connected by high pressure shaft 34) each extend from main compressor section 14 to main turbine section 18. Air flows from main compressor section 14 to main turbine section 18 along engine gas flow path 36.

Propulsion fan 38 is connected to and driven by low pressure spool 20. Fan drive gear system 40 may be included between the propulsion fan 38 and low pressure spool 20. In alternative embodiments, propulsion fan 38 can be connected to low pressure spool 20, high pressure spool 28, or another spool (not shown) directly, without fan drive gear system 40. In further alternative embodiments, propulsion fan 38 can be omitted, such as applications where gas turbine engine 10 is an auxiliary power unit (APU) or an industrial gas turbine engine. The general construction and operation of gas turbine engines is well-known in the art, and therefore detailed discussion here is unnecessary.

Gearbox assembly 12 is an accessory gearbox assembly including gearbox 42 and accessory 44. Gearbox 42 is an accessory gearbox that drives one or more accessories, including accessory 44. Accessory 44 can be one of a number of accessories driven by accessory gearboxes, such as alternators, pumps, and engine starters. Gearbox 42 is connected to and driven by high pressure spool 28 via shaft 46.

Gearbox 42 includes housing 48 and a number of shafts, gears, and bearings, such as shafts 46 and 50, gears 52 and 54, and bearing 56 and 58. Shaft 50 is a gear shaft mounted to housing 48 via bearings 56 and 58. Bearings 56 and 58 are positioned at opposite ends 60 and 62 of shaft 50 to allow shaft 50 to rotate about axis A. Bearing 56 and end 60 of shaft 50 are mounted on wall 64 of housing 48. Bearing 58 and end 62 of shaft 50 are mounted on wall 66 of housing 48, opposite of wall 64.

Gear 54 is mounted on shaft 50 so as to rotate with shaft 50 about axis A. Gear 52 is mounted on shaft 46 so as to rotate with shaft 46. Gear 54 is engaged with gear 52 so that shafts 46 and 50 are connected via gearing. Additional gearing (not shown) can connect shaft 46 to high pressure spool 28. Thus, when high pressure spool 28 rotates, it drives rotation of shaft 46 which drives rotation of shaft 50.

Accessory 44 is mounted to accessory pad 68 of gearbox 42. Accessory pad 68 is integrally formed with housing 48. Accessory pad 68 includes hole 70 extending through housing 48. Shaft 72 is an accessory shaft extending through hole 70 of housing 48 to connect accessory 40 to shaft 50. Shafts 50 and 72 are interconnected via splines 74 and 76. Splines 74 are a first set of splines on inner surface 78 of shaft 50 at end 60. Splines 76 are a second set of splines on an outer surface of shaft 72. Splines 74 are engaged with splines 76 such that shafts 50 and 72 rotate coaxially about axis A. Splines 74 and 76 are configured to allow relative movement between shafts 50 and 72 axially along axis A. Because of this axial movement, splines 74 and 76 can benefit from lubrication during operation. However, since there is relatively little relative movement between splines 74 and 76, a relatively small amount of lubricating liquid can service the lubrication needs of splines 74 and 76.

During operation of gearbox assembly 12, a lubrication system (not shown) supplies lubricating liquid to gears and bearings (including gears 52 and 54 and bearings 56 and 58) within housing 48. Because gears 52 and 54, bearings 56 and 58, and shafts 46 and 50 rotate at relatively high speed, that lubricating liquid is slung around housing 48, and can collect on inner surface 80 of housing 48. Some of that lubricating liquid slides down inner surface 80 into scupper 82. Scupper 82 is positioned on inner surface 80 of housing 48 proximate shaft 50 so as to direct lubricating liquid collected by scupper 82 into holes 84 of shaft 50. Holes 84 are entry holes that allow lubricating liquid to flow into a central cavity defined by inner surface 78 of shaft 50. That lubricating liquid can then lubricate splines 74 and 76 as further described below.

Figure 2:
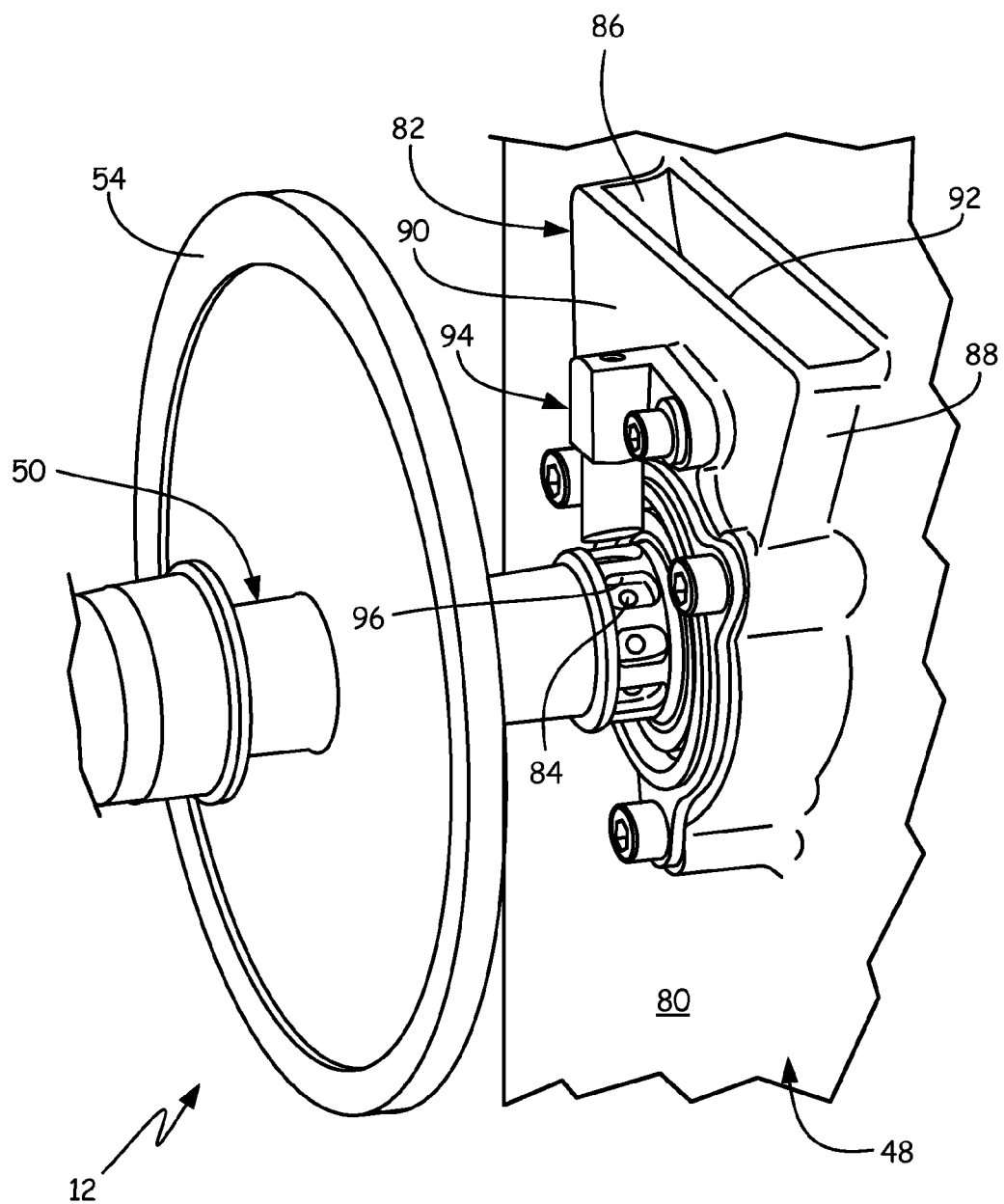
FIG. 2 is a perspective view of a portion of an interior of the accessory gearbox assembly if FIG. 1.

FIG. 2 is a perspective view of a portion of an interior of gearbox assembly 12. FIG. 2 shows scupper 82 mounted on inner surface 80 of housing 48. In the illustrated embodiment, scupper 82 is integrally formed with housing 48. Scupper 82 includes walls 86 and 88, extending substantially perpendicularly from inner surface 80. Scupper 82 also includes wall 90 extending from wall 86 to wall 88, substantially parallel to inner surface 80. Walls 86, 88, and 90 combine with inner surface 80 such that scupper 82 has an open top 92 and a closed bottom (not shown). In alternative embodiments, scupper 82 can have a shape different than as illustrated, so long as scupper 82 can collect lubricating liquid slung against inner surface 80.

Flow distributor 94 is connected to scupper 82 and configured for directing flow from scupper 82 to holes 84. Holes 84 are positioned circumferentially around shaft 50, with each hole 84 positioned at a bottom of one of indentations 96. Indentations 96 are also positioned circumferentially around shaft 50. Indentations 96 are positioned and shaped to funnel lubricating liquid dripped from flow distributer 94 into holes 84. When gear 54 and shaft 50 rotate, a different one of indentations 96 and holes 84 is aligned with flow distributor 94.

Figure 3:
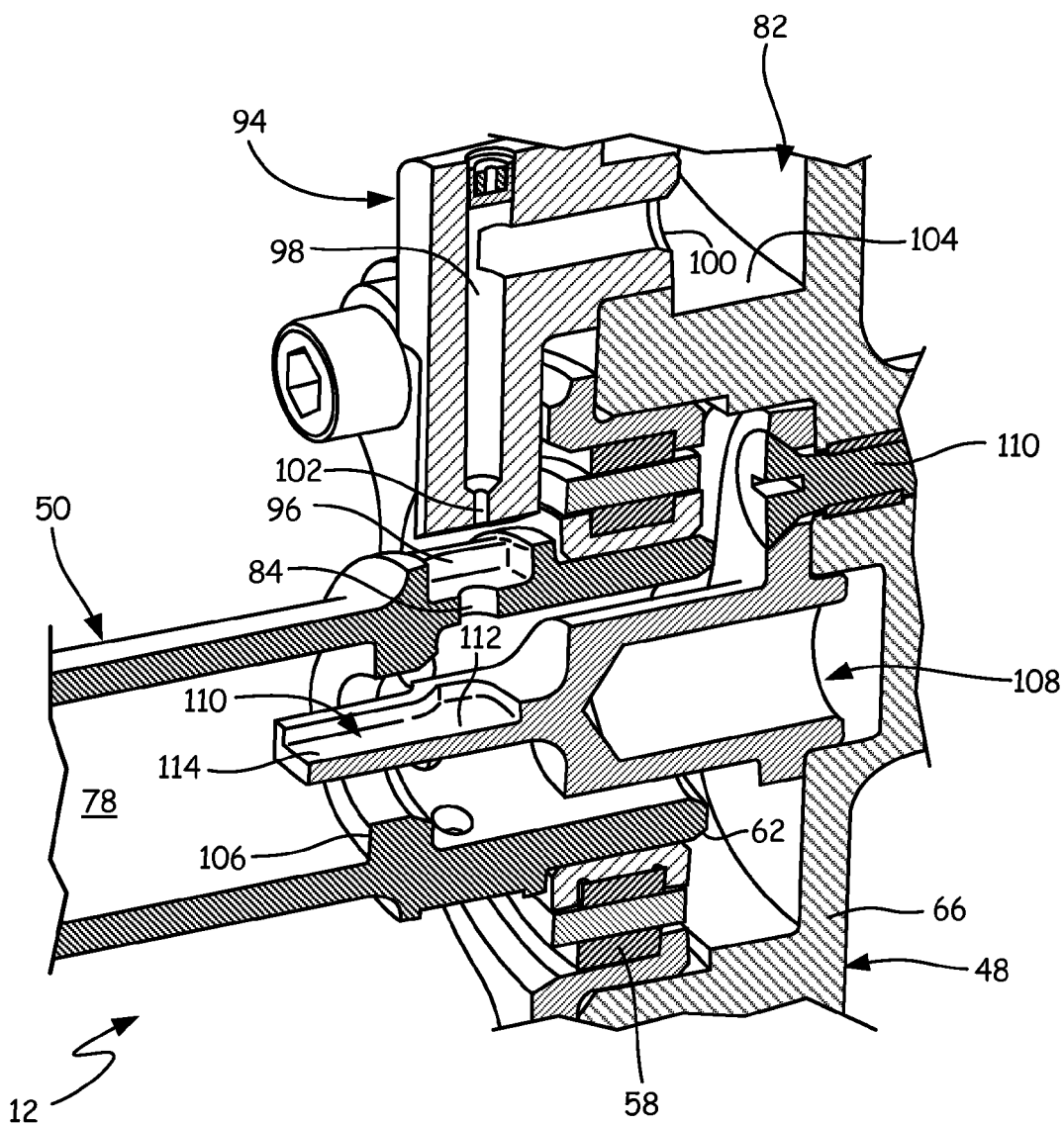
FIG. 3 is a perspective sectional view of a portion of the accessory gearbox assembly of FIGS. 1 and 2.

FIG. 3 is a perspective sectional view of a portion of gearbox assembly 12. Flow distributor 94 defines hollow passage 98 extending from passage inlet 100 to passage outlet 102. Passage inlet 100 is fluidically connected to scupper 82 near bottom 104 of scupper 82. Passage outlet 102 is angled substantially vertically downward toward holes 84 in shaft 50.

Shaft 50 has annular dam 106 extending radially inward from inner surface 78 of shaft 50. Annular dam 106 is axially positioned between holes 84 and splines 74 (shown in FIG. 1). Oil catch pan 108 is mounted to housing 48 via threaded fastener 110. Oil catch pan 108 extends from housing 48 into the central cavity defined by inner surface 78 of shaft 50. Oil catch pan 108 extends through a hole defined by annular dam 106. Oil catch pan 108 includes pan basin 110, which includes collection area 112 and drip ledge 114. Pan basin 110 is substantially flat from collection area 112 to drip ledge 114. Collection area 112 is axially aligned with holes 84 so as to collect lubricating liquid dripped from flow distributor 94 into holes 84. Pan basin 110 extends from collection area 112, across annular dam 106, to drip ledge 114. Lubricating liquid that collects in collection area 112 flows across annular dam 106 and flows over drip ledge 114 to collect against inner surface 78 of shaft 50. Annular dam 106 extends inward from inner surface 78 to cause lubricating liquid to pool in shaft 50, as opposed to flowing out holes 84.

During operation of gearbox assembly 12, lubricating liquid in housing 48 is slung against inner surface 80 (shown in FIG. 1) of housing 48, and a portion of that lubricating liquid is collected in scupper 82. While shaft 50 is rotating at relatively high speeds, little or no lubricating liquid flows from scupper 82 into holes 84. In one embodiment, lubricating liquid collected in scupper 82 can flow through flow distributor 94 to shaft 50, but because shaft 50 is rotating at high speeds, that lubricating liquid is slung outwards toward inner surface 80 of housing 48. In another embodiment, rotation of shaft 50 can create air currents caused by windage effects. These air currents can either block or limit lubricating liquid flow from flow distributor 94, thus causing lubricating liquid collected in scupper 82 to back up, and eventually fill scupper 82.

When gas turbine engine 10 (shown in FIG. 1) stops, shaft 50 will slow and eventually stop rotating, allowing lubricating liquid to flow from scupper in through holes 84 to oil catch pan 108. The lubricating liquid is directed by oil catch pan 108 past annular dam 106 to collect in shaft 50 near splines 74 and 76 (shown in FIG. 1). When gas turbine engine 12 is restarted and shaft 50 begins rotating again, annular dam 106 keeps that lubricating liquid contained between annular dam 106 and splines 74 and 76 so that the lubricating liquid can lubricate splines 74 and 76 during operation. Thus, gearbox assembly 12 can provide what is effectively one shot of lubricating liquid to splines 74 and 76 at the time of shut down, as opposed to providing a continuous flow of lubricating liquid to splines 74 and 76 during operation. Scupper 82, annular dam 106, and other components can be sized such that the amount of lubricating liquid collected between annular dam 106 and splines 74 and 76 is sufficient to lubricate splines 74 and 76 during a complete operating period.

Because splines 74 and 76 have little relative motion during operation, they can operate with the relatively small quantity of lubricating liquid provided in a single shot at the time of shut down. Splines 74 and 76 need not receive a continuous supply of lubricating liquid during operation. This can be beneficial in a number of ways. For example, the lubrication system (not shown) need not be sized for additional flow that would be needed for a continuous flow of lubricating liquid through an oil jet to splines 74 and 76. Additionally, if maintenance personnel fail to properly seal shaft 72 (shown in FIG. 1) to shaft 50, only the single shot of lubricating liquid supplied to splines 74 and 76 could potentially leak out. This can avoid an emergency engine shut down caused by leaking a continuous supply of lubricating liquid, which could be possible in some prior art designs.

Figure 4:
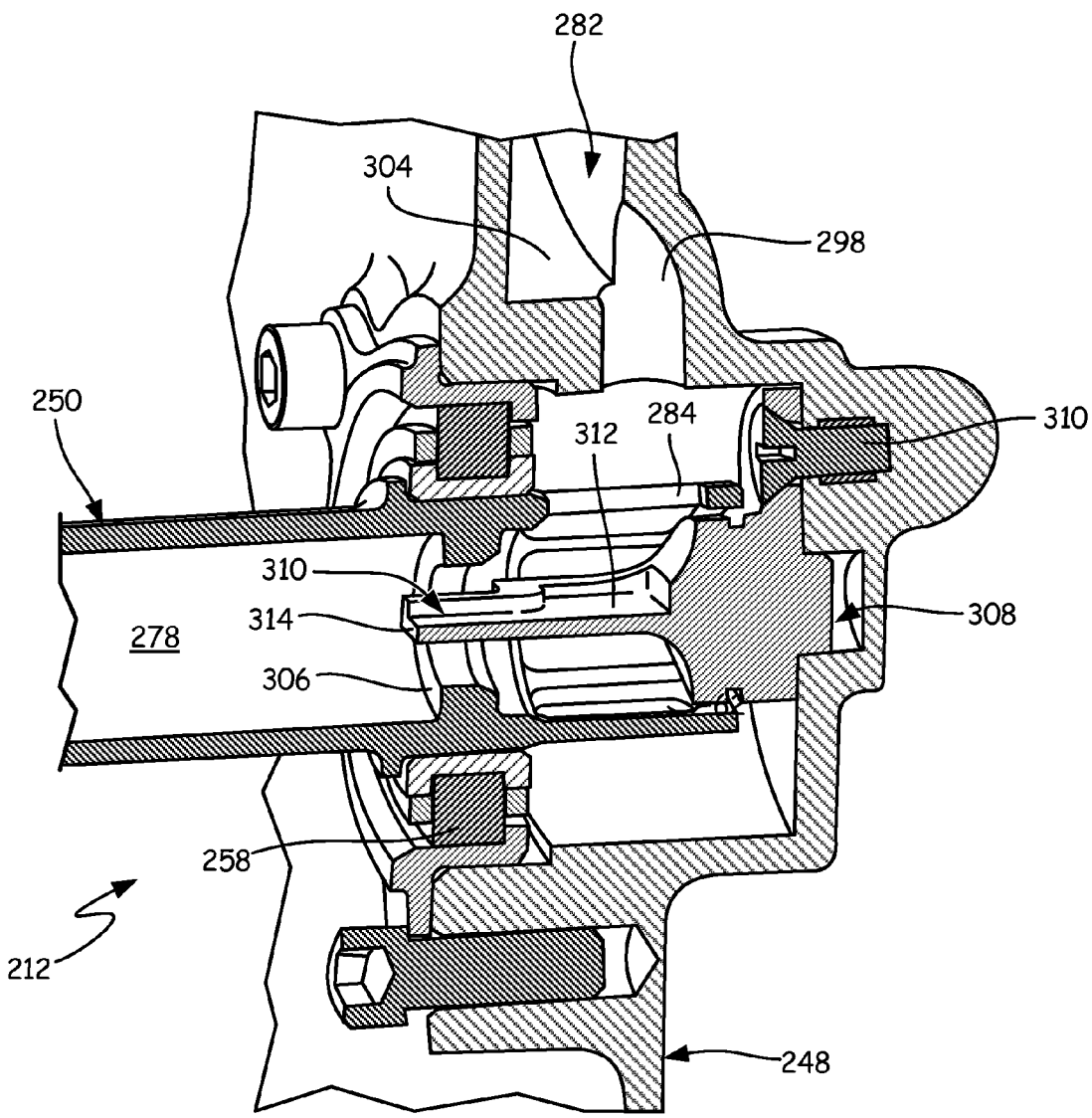
FIG. 4 is a perspective sectional view of a portion of an alternative embodiment the accessory gearbox assembly of FIGS. 1-3.

FIG. 4 is a perspective sectional view of a portion of gearbox assembly 212, which is an alternative embodiment of gearbox assembly 12 (shown in FIGS. 1-3). Gearbox assembly 212 is substantially similar to gearbox assembly 12 except that flow distributor 94 (shown in FIG. 3) is omitted and shaft 250 is extended so that holes 284 are positioned axially toward the right of bearing 258 (as oriented in FIG. 4). Hollow passage 298 extends from bottom 304 of scupper 282 through housing 248 to allow lubricating liquid to flow from scupper 282 through holes 284 into shaft 250. Oil catch pan 308 is mounted to housing 248 via threaded fastener 110, and extends into a central cavity defined by inner surface 278 of shaft 250. Lubricating liquid dripping through holes 284 collects in collection area 312 of oil catch pan 308, and flow across pan basin 310 to drip ledge 314 on an opposite side of annular dam 306. Annular dam 306 keeps that lubricating liquid contained between annular dam 306 and splines 74 and 76 (shown in FIG. 1) so that the lubricating liquid can lubricate splines 74 and 76 during operation. Thus, gearbox assembly 212 lubricates splines 74 and 76 in a similar manner to that of gearbox assembly 12, but with a different configuration.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, shafts 50 and 250, scuppers 82 and 282, and the related components need not be shaped and positioned precisely as illustrated so long as they combine to form a system suitable for directing liquid from the scupper to splines 74 and 76 for lubricating splines 74 and 76.

DISCUSSION OF POSSIBLE EMBODIMENTS

The following are non-exclusive descriptions of possible embodiments of the present invention.

A gearbox assembly for use in a gas turbine engine can include a gearbox housing. A first shaft can be rotatably mounted in the gearbox housing, having a first set of splines, and defining a central cavity. A second shaft can have a second set of splines engaged with the first set of splines. A scupper can be positioned on an inner surface of the gearbox housing proximate the first shaft so as to direct liquid from the scupper through the central cavity of the first shaft to the first and second sets of splines.

The gearbox assembly of the preceding paragraph can optionally include, additionally and/or alternatively any, one or more of the following features, configurations and/or additional components:

the first shaft can have a plurality of entry holes positioned with respect to the scupper for receiving liquid from the scupper;

a flow distributor can be connected to the scupper for directing flow from the scupper to the entry holes;

an oil catch pan can be mounted to the gearbox housing, positioned inside the first shaft and axially aligned with the entry holes;

the first shaft can have an annular dam extending radially inward from first shaft, the annular dam can be axially positioned between the entry holes and the first set of splines, and the oil catch pan can extend through a hole in the annular dam;

the oil catch pan can include a collection area axially aligned with the entry holes and a drip ledge positioned on an opposite side of the annular dam from the collection area;

the first shaft can have an annular dam extending radially inward from first shaft, and the annular dam can be axially positioned between the entry holes and the first set of splines;

the first shaft can be a gear shaft, the second shaft can be an accessory shaft, and a rotatable accessory can be connected to and driven by the second shaft;

the scupper can include first and second walls extending substantially perpendicularly from the inner surface, and a third wall extending from the first wall to the second wall such that the scupper has an open top;

a hollow passage can extend from a bottom of the scupper through the gearbox housing to fluidically connect the scupper to the central cavity; and/or A gas turbine engine can include the gearbox assembly, a spool having a compressor connected to a turbine via a spool shaft, and a third shaft extending from the spool to the gearbox assembly and connected via gearing to the spool and to the first shaft.

A method can include rotating first and second shafts interconnected by splines and mounted to a gearbox and collecting lubricating liquid in a scupper positioned on an inner surface of the gearbox. Lubricating liquid can flow from the scupper through the first shaft to the splines when the first and second shafts stop rotating.

The method of the preceding paragraph can optionally include, additionally and/or alternatively any, one or more of the following features, configurations and/or additional steps:

flow from the scupper to the first shaft can be limited when the first and second shafts are rotating at normal operating speed;

the lubricating liquid can flow from the scupper through entry holes positioned circumferentially around the first shaft;

lubricating liquid can flow from the entry holes across an annular dam to the splines via an oil catch pan; and/or rotation of the first and second shafts can be driven via a spool of a gas turbine engine.

A method can include rotating first and second shafts interconnected by splines and mounted to a gearbox. A single shot of lubricating liquid can flow to the splines when the first and second shafts stop rotating. Substantially no additional lubricating liquid can flow to the splines when the first and second shafts start rotating again.

The method of the preceding paragraph can optionally include, additionally and/or alternatively any, one or more of the following features, configurations and/or additional steps:

lubricating liquid can be collected in a scupper positioned on an inner surface of the gearbox, and lubricating liquid can flow from the scupper through entry holes in the first shaft to the splines when the first and second shafts stop rotating;

lubricating liquid can flow from the entry holes across an annular dam to the splines via an oil catch pan; and/or the single shot of lubricating liquid can be collected between the splines and an annular dam extending radially inward on an inner surface of the first shaft.

The invention claimed is:

1. A gearbox assembly for use in a gas turbine engine, the gearbox assembly comprising:
   a gearbox housing;
   a first shaft rotatably mounted in the gearbox housing, having a first set of splines, and defining a central cavity;
   a second shaft having a second set of splines engaged with the first set of splines;
   a scupper positioned on an inner surface of the gearbox housing proximate the first shaft so as to direct liquid from the scupper through the central cavity of the first shaft to the first and second sets of splines, wherein the first shaft has a plurality of entry holes positioned with respect to the scupper for receiving liquid from the scupper; and
   an oil catch pan mounted to the gearbox housing and positioned inside the first shaft and axially aligned with the entry holes.

2. The gearbox assembly of claim 1, wherein the first shaft has an annular dam extending radially inward from first shaft, wherein the annular dam is axially positioned between the entry holes and the first set of splines, and wherein the oil catch pan extends through a hole in the annular dam.

3. The gearbox assembly of claim 2, wherein the oil catch pan comprises:
   a collection area axially aligned with the entry holes; and
   a drip ledge positioned on an opposite side of the annular dam from the collection area.

4. The gearbox assembly of claim 1, wherein the first shaft has an annular dam extending radially inward from first shaft and wherein the annular dam is axially positioned between the entry holes and the first set of splines.

5. The gearbox assembly of claim 1, and further comprising:
   a rotatable accessory connected to and driven by the second shaft, wherein the first shaft is a gear shaft and the second shaft is an accessory shaft.

6. The gearbox assembly of claim 1, wherein the scupper comprises:
   first and second walls extending substantially perpendicularly from the inner surface; and a third wall extending from the first wall to the second wall such that the scupper has an open top.

7. The gearbox assembly of claim 1, wherein a hollow passage extends from a bottom of the scupper through the gearbox housing to fluidically connect the scupper to the central cavity.

8. A gas turbine engine comprising:
the gearbox assembly of claim 1;
a spool, wherein the spool comprises:
   a compressor;
   a turbine; and
   a spool shaft connecting the compressor to the turbine;
a third shaft extending from the spool to the gearbox assembly; and
gearing connecting the third shaft to the spool and to the first shaft.

9. A method comprising:
rotating first and second shafts interconnected by splines and mounted to a gearbox;
collecting lubricating liquid in a scupper positioned on an inner surface of the gearbox;
flowing lubricating liquid from the scupper through the first shaft to the splines when the first and second shafts stop rotating, wherein the lubricating liquid flows from the scupper through entry holes positioned circumferentially around the first shaft; and
flowing lubricating liquid from the entry holes across an annular dam to the splines via an oil catch pan.

10. The method of claim 9, and further comprising:
limiting flow from the scupper to the first shaft when the first and second shafts are rotating at normal operating speed.

11. The method of claim 9, and further comprising:
driving rotation of the first and second shafts via a spool of a gas turbine engine.

12. A method comprising:
rotating first and second shafts interconnected by splines and mounted to a gearbox;
collecting lubricating liquid in a scupper positioned on an inner surface of the gearbox;
flowing lubricating liquid from the scupper through entry holes in the first shaft to an oil catch pan when the first and second shafts stop rotating
flowing lubricating liquid from the entry holes across an annular dam to the splines via the oil catch pan; and
flowing no additional lubricating liquid to the splines when the first and second shafts start rotating again.

13. The method of claim 12, and further comprising:
collecting the lubricating liquid between the splines and the annular dam, wherein the annular dam extends radially inward on an inner surface of the first shaft.

* * * * *